July 13, 1965  E. BENSEMA  3,195,034
APPARATUS FOR MONITORING VIBRATIONS OF A FAN
Filed April 20, 1962
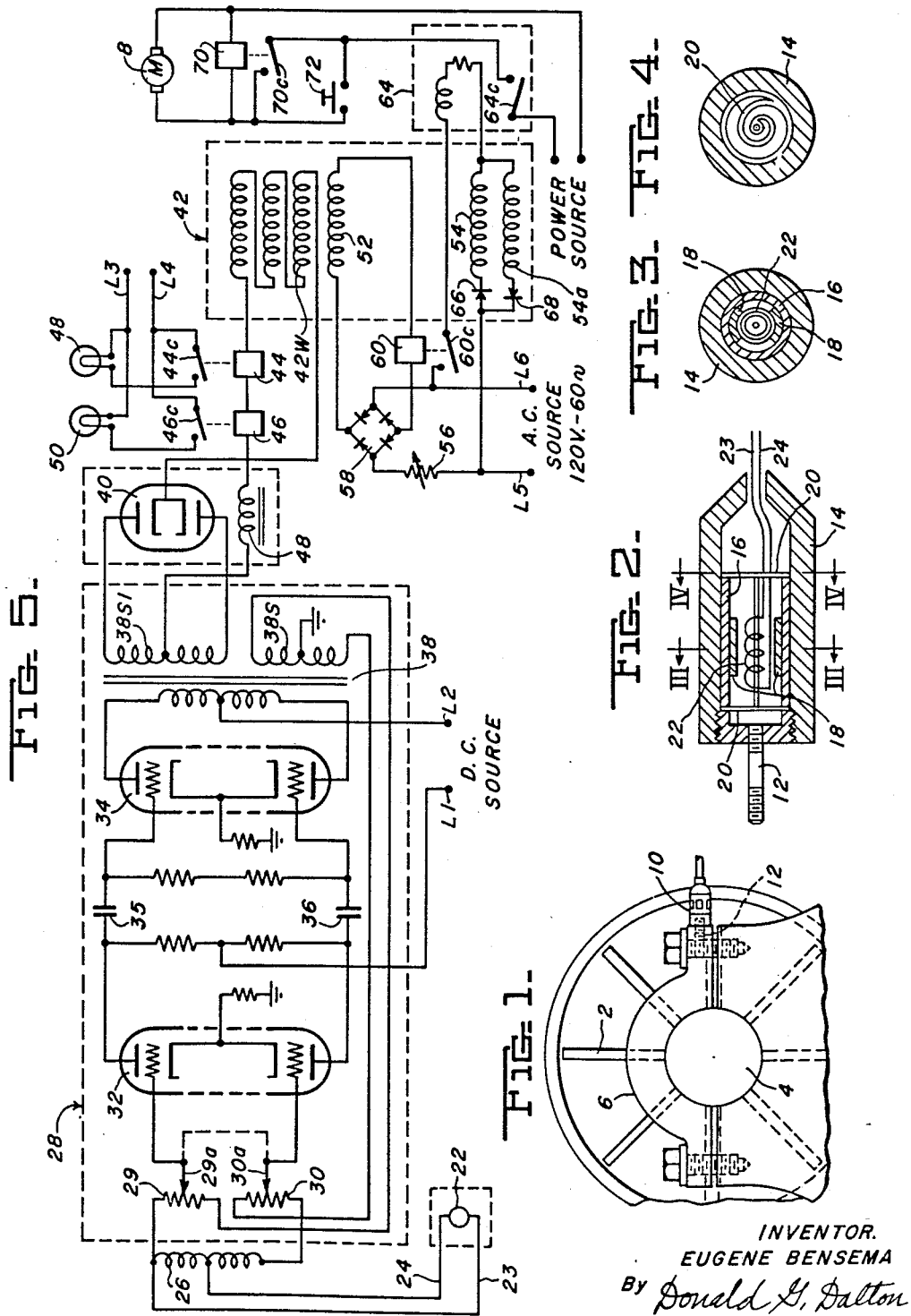
INVENTOR.
EUGENE BENSEMA
By Donald G. Dalton
Attorney United States Patent Office 3,195,034
Patented July 13, 1965

3,195,034
APPARATUS FOR MONITORING VIBRATIONS OF A FAN
Eugene Bensema, Chicago, Ill., assignor to United States Steel Corporation, a corporation of New Jersey
Filed Apr. 20, 1962, Ser. No. 189,182
2 Claims. (Cl. 318—460)

This invention relates to apparatus for monitoring vibrations of a fan and more particularly to a fan subject to temperature changes. I have found that sudden temperature changes within the rotor of fans often adversely affect their vibration amplitude, thus rendering the fan vulnerable to serious damage. In many instances the rate of increase of vibration amplitude increases faster as the vibration amplitude becomes higher. However, in some instances the amplitude may exceed that thought to be safe for only a short period of time and then decreases to the safe amplitude. Under these circumstances it is undesirable to stop the fan. Vibrations often increase from other causes and in some instances these are momentary and in other instances persistent. Those controls of which I have knowledge can only be set to stop the fan at one level of vibration amplitude and as a result either act too fast or too slow in many instances.

It is therefore an object of my invention to provide apparatus for monitoring vibrations of a fan which will stop the fan when its vibrations exceed a predetermined level wherein the speed of operation increases as the magnitude of the vibrations increase.

This and other objects will be more apparent after referring to the following specification and attached drawings, in which:

FIGURE 1 is a somewhat schematic view of a fan with a vibration pickup attached thereto;

FIGURE 2 is an enlarged sectional view of the pickup of FIGURE 1;

FIGURE 3 is a view taken on the line III—III of FIGURE 2;

FIGURE 4 is a view taken on the line IV—IV of FIGURE 2; and

FIGURE 5 is a schematic wiring diagram of the controls of my invention.

Referring more particularly to the drawings, reference number 2 indicates a fan having a shaft 4 mounted in bearings 6 and driven by a motor 8. A vibration pickup 10 is attached to one of the bearings 6 by means of a probe 12 threaded into a hole in the bearing. The vibration pickup 10 is conventional and for example may be a Model 544 vibration pickup manufactured by International Research and Development Corporation of Worthington, Ohio. The pickup 10 includes a cylindrical housing 14 having a closed end which supports probe 12, a cylinder 16 which supports permanent magnets 18, and two flexible diaphragms 20 which support a coil of wire 22 within the field of magnets 18. Wires 23 and 24 which are connected to coil 22 are connected to a phase inverting transformer 26. The output of transformer 26 is connected to a standard two-stage push pull amplifier 28 which includes two calibrating potentiometers 29 and 30 having their arms 29a and 30a mechanically connected for movement together. The arms 29a and 30a are electrically connected to the grids of triode vacuum tube 32 such as type 6SN7. The anodes of tube 32 are connected to the grids of a second triode vacuum tube 34 through capacitors 35 and 36. The anodes of tube 34 are connected to the primary of a transformer 38. One section 38S of the secondary of transformer 38 is connected to potentiometers 29 and 30 so as to furnish negative feedback voltage thereto for controlling the amplifier gain. Amplifier 18 also includes the usual resistors as shown. Direct current for operating tubes 32 and 34 is supplied from D.C. power source L1, L2. Another section 38S1 of the secondary of transformer 38 is connected to a vacuum tube diode 40 which rectifies the amplified voltage and produces a direct current which is suitable for operating control windings 42W of a self-saturating magnetic amplifier 42. Relay coils 44 and 46 and inductance 48 are connected in series with control windings 42W. Coils 44 and 46 have normally open contacts 44c and 46c which are connected in series with signal devices 48 and 50, respectively, to a power source L3, L4. The signal 48 may be a green light and the signal 50 a yellow light. The amplifier 42 also includes a bias winding 52 and load windings 54 and 54a.

A 120 v. 60 cycle power source L5, L6 is connected through adjustable resistor 56 to a rectifier 58 which supplies rectified current to bias winding 52 through a relay 60. The relay 60 has a normally open contact 60c which is connected to power source L5, L6 in series with an induction relay 64, load windings 54 and 54a, and rectifiers 66 and 68 which are oppositely disposed. Winding 54 and rectifier 66 are connected in parallel with winding 54c and rectifier 68. Induction relay 64 is of standard type such as Type 1AC51B manufactured by General Electric and has a normally open contact 64c which is connected in the power circuit of motor 8 in series with normally open contact 70c of relay 70. A starting push button switch 72 is connected in parallel with contact 70c.

The operation of my device is as follows:

The voltage developed by vibration pickup 10 increases as the amplitude of vibration increases. Assuming that a 15 mils level of vibration will cause damage to the fan and that it is desired to stop the fan motor 8 at that level of vibration, the operator will adjust the feedback voltage accordingly by moving the potentiometer arms 29a and 30a to the required position. If it is desired to give signals at 7 and 11 mils, relay 44 is adjusted so that its contact will close when a vibration of 7 mils occurs and relay 46 is adjusted so that its contact will close when a vibration of 11 mils occurs. Resistor 56 is set so as to obtain the desired bias current. In one particular example the voltage output of pickup 10 is 0.252 volt at 7 mils vibration. When the vibration reaches 7 mils the amplified voltage from amplifier 28 is rectified by rectifier tube 40 and the resultant direct current will pass through control windings 42W and relays 44 and 46, closing contact 46c and lighting green light 48. If the vibration continues to increase to 11 mils the voltage output of pickup 10 will increase to 0.396 volt and contact 46c will close to light yellow light 50.

If the vibration increases to 15 mils the voltage output of pickup 10 will increase to 0.540 volt and this will cause 0.5 amp. to flow through the coil of inductance relay 64 which is sufficient to open its contact 64c after a considerable time delay thus deenergizing coil 70 and opening its contact 70c. Thus, the fan motor 8 is shut down. To start the motor 8 in operation after contact 64c is again closed, switch 72 is momentarily closed to energize relay coil 70, thus closing its contact 70c and locking it in. If the vibration increases to a higher magnitude the time required for contact 64c to open is decreased with the time becoming shorter as the magnitude of vibration increases.

In case the bias winding current decreases below a predetermined value contact 60c will open. It is well known that decrease in bias current will cause an increase in the load current of the magnetic amplifier 42 and opening of contact 60c will thus prevent shut down of the fan from any circuit fault within the apparatus which causes loss of bias current.

While one embodiment of my invention has been

I claim:

1. Apparatus for monitoring vibrations of a member comprising a vibration pickup having an output proportional to the amplitude of vibrations and adapted to measure vibrations of said member, a phase inverting transformer connected to the output of said vibration pickup, an amplifier connected to the output of said transformer, means associated with said amplifier for providing an adjustable feedback voltage thereto, a rectifier connected to the output of said amplifier, a self-saturating magnetic amplifier including a control winding, a bias winding and two load windings connected in parallel, a rectifier connected in series with each load winding, the last named rectifiers being oppositely disposed with respect to one another, means connecting the output of said first named rectifier to said control winding, an induction relay connected to an A.C. power source in series with said load windings and last named rectifiers, and means operable by said induction relay when the amplitude of the vibrations exceeds a predetermined level.

2. Apparatus for monitoring vibrations of a member comprising a vibration pickup having an output proportional to the amplitude of vibrations and adapted to measure vibrations of said member, a phase inverting transformer connected to the output of said vibration pickup, an amplifier connected to the output of said transformer, means associated with said amplifier for providing an adjustable feedback voltage thereto, a rectifier connected to the output of said amplifier, a self-saturating magnetic amplifier including a control winding, a bias winding and two load windings connected in parallel, a rectifier connected in series with each load winding, the last named rectifiers being oppositely disposed with respect to one another, means connecting the output of said first named rectifier to said control winding, an induction relay connected to an A.C. power source in series with said load windings and last named rectifiers, and means operable by said induction relay to stop vibration of said member when the amplitude of the vibrations exceeds a predetermined level.

References Cited by the Examiner
UNITED STATES PATENTS

| | | | |
|---|---|---|---|
| 2,235,928 | 3/41 | Hardinge | 318—460 |
| 2,395,995 | 3/46 | Dewey | 230—271 X |
| 2,575,710 | 11/51 | Hardigg | 73—71.4 |
| 2,595,524 | 5/52 | Henneman et al. | 318—460 |
| 2,679,187 | 5/54 | Bitting | 318—460 |
| 2,799,015 | 7/57 | Bell | 340—261 |
| 2,920,264 | 1/60 | Wintrode | 318—513 |
| 2,985,010 | 5/61 | Piltz | 73—71.4 |
| 2,985,823 | 5/61 | Wright | 73—71.4 |
| 3,095,532 | 6/63 | Floyd | 318—460 |

ROBERT M. WALKER, *Primary Examiner.*

LAURENCE V. EFNER, *Examiner.*